US008572242B2

(12) United States Patent
Ghosh

(10) Patent No.: US 8,572,242 B2
(45) Date of Patent: Oct. 29, 2013

(54) LEVERAGING PASSIVE NETWORKS

(75) Inventor: Debashis Ghosh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 226 days.

(21) Appl. No.: 12/984,362

(22) Filed: Jan. 4, 2011

(65) Prior Publication Data

US 2012/0173707 A1     Jul. 5, 2012

(51) Int. Cl.
*G06F 15/173*     (2006.01)
*G06F 15/177*     (2006.01)
*G06Q 99/00*     (2006.01)

(52) U.S. Cl.
USPC ............ 709/224; 709/225; 709/220; 705/319

(58) Field of Classification Search
None
See application file for complete search history.

(56) References Cited

U.S. PATENT DOCUMENTS

| 7,707,122 | B2 | 4/2010 | Hull et al. |
| 7,716,140 | B1 | 5/2010 | Nielsen et al. |
| 7,730,409 | B2 | 6/2010 | Gorzela |
| 8,239,499 | B2 * | 8/2012 | Kwon ............................ 709/220 |
| 2004/0122803 | A1 * | 6/2004 | Dom et al. ......................... 707/3 |
| 2009/0248738 | A1 | 10/2009 | Martinez et al. |
| 2010/0146118 | A1 * | 6/2010 | Wie ............................. 709/225 |
| 2012/0221514 | A1 * | 8/2012 | Knight et al. .................. 707/610 |

* cited by examiner

*Primary Examiner* — Andrew L Nalven
*Assistant Examiner* — Quy Pham
(74) *Attorney, Agent, or Firm* — Michael A. Springs

(57) ABSTRACT

System and methods for leveraging passive networks are disclosed. In one embodiment, a method includes receiving, from a first data source, a first data descriptor, wherein the first data descriptor identifies an instance of contact between at least two persons. The method also includes determining a connection between the at least two persons, wherein the connection is based on an instance of contact between the at least two persons identified in the first data descriptor. The method further includes determining, with a processor, a first contact count for the connection, the first contact count based on a number of instances of contact between the at least two persons associated with the connection. The method also includes calculating, with the processor, a connection score for the connection, wherein the connection score is based at least in part on the first contact count.

12 Claims, 3 Drawing Sheets

LEVERAGING PASSIVE NETWORKS

TECHNICAL FIELD OF THE INVENTION

The invention relates generally to analyzing information in networks, and more particularly to leveraging passive networks.

BACKGROUND OF THE INVENTION

Due to the proliferation and accessibility of information and media, an individual is able to develop contacts with other individuals across a wide array of technological platforms. Moreover, as the number and frequency of the contacts change, the complexity of the social network developed through the contacts rises exponentially. Understanding and using these complex networks remains a challenge.

SUMMARY OF THE INVENTION

In accordance with particular embodiments of the present disclosure, the disadvantages and problems associated with leveraging passive networks.

In accordance with a particular embodiment of the present disclosure, a method includes receiving, from a first data source, a first data descriptor, wherein the first data descriptor identifies an instance of contact between at least two persons. The method also includes determining a connection between the at least two persons, wherein the connection is based on an instance of contact between the at least two persons identified in the first data descriptor. The method further includes determining, with a processor, a first contact count for the connection, the first contact count based on a number of instances of contact between the at least two persons associated with the connection. The method also includes calculating, with the processor, a connection score for the connection, wherein the connection score is based at least in part on the first contact count.

In accordance with another embodiment of the present disclosure, a system includes a first data source operable to transmit a first data descriptor, wherein the first data descriptor identifies an instance of contact between at least two persons. The system also includes an analysis module operable to receive the first data descriptor from the first data source. The analysis module is also operable to determine a connection between the at least two persons, wherein the connection is based on an instance of contact between the at least two persons identified in the first data descriptor. The analysis module is further operable to determine, with a processor, a first contact count for the connection, the first contact count based on a number of instances of contact between the at least two persons associated with the connection and calculate, with the processor, a connection score for the connection, wherein the connection score is based at least in part on the first contact count.

In accordance with yet another embodiment of the present disclosure, a non-transitory computer readable medium is encoded with logic, the logic operable, when executed on a processor to receive a first data descriptor from a first data source, wherein the first data descriptor identifies an instance of contact between at least two persons. The logic is also operable to determine a connection between the at least two persons, wherein the connection is based on an instance of contact between the at least two persons identified in the first data descriptor. The logic is further operable to determine a first contact count for the connection, the first contact count based on a number of instances of contact between the at least two persons associated with the connection and calculate a connection score for the connection, wherein the connection score is based at least in part on the first contact count.

Technical advantages provided by particular embodiments of the present disclosure include determining a connection path between two or more persons. Particular embodiments may determine a shortest path between two persons and/or a path with the strongest relationships between two persons. In a sales operation, this may facilitate an introduction between two persons who were previously unknown to each other. For example, a sales person may wish to be introduced to a manager at a target company. Utilizing particular embodiments, relationships between various connections may be determined to allow the sales person to identify the desired contact. Thus, the sales person may be able to contact one or more persons in a relationship path to obtain an introduction to the manager. In particular embodiments, a user may query persons that have a particular subject matter expertise. For example, an engineer may need to find another engineer that has a particular expertise. Utilizing particular embodiments, the engineer may query for the particular subject matter expertise, and relationships between various connections may be determined to find a person with the searched-for subject matter expertise. As another example, a user may query for a particular service provider, such as, for instance, a lawyer. Utilizing particular embodiments, relationships between the user and various connections may be determined to allow the user to identify and/or contact a lawyer. Particular embodiments may additionally be able to determine a person's immediate or remote connections, and identify the relative strength of those connections. This may facilitate the investigation of fraud rings. For example, an organization may suspect a person of committing fraud, and may utilize particular embodiments of the present disclosure to determine who the suspected person was communicating with, and the relative strength of those contacts. As a result, particular embodiments of the present disclosure may provide numerous technical advantages. Nonetheless, particular embodiments may provide some, none, or all of these technical advantages, and may provide additional technical advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1A:
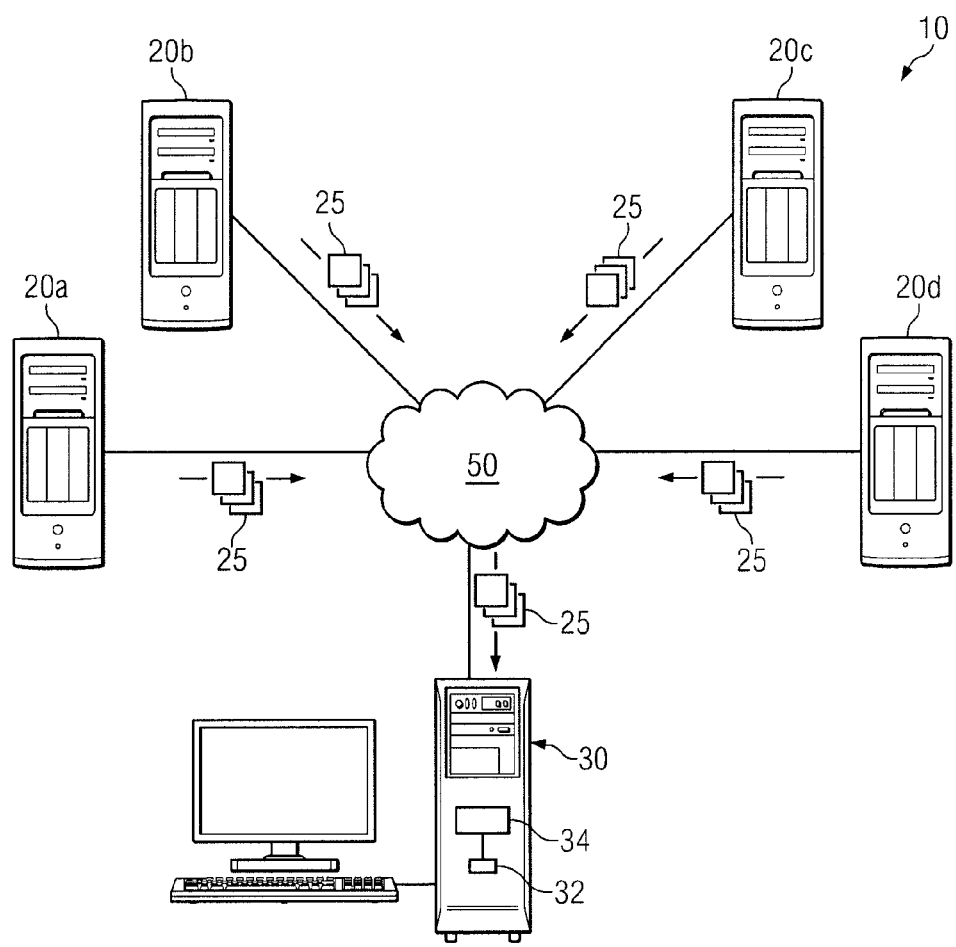
FIGS. 1A-1D illustrate components of an information management system according to a particular embodiment.
Figure 1B:
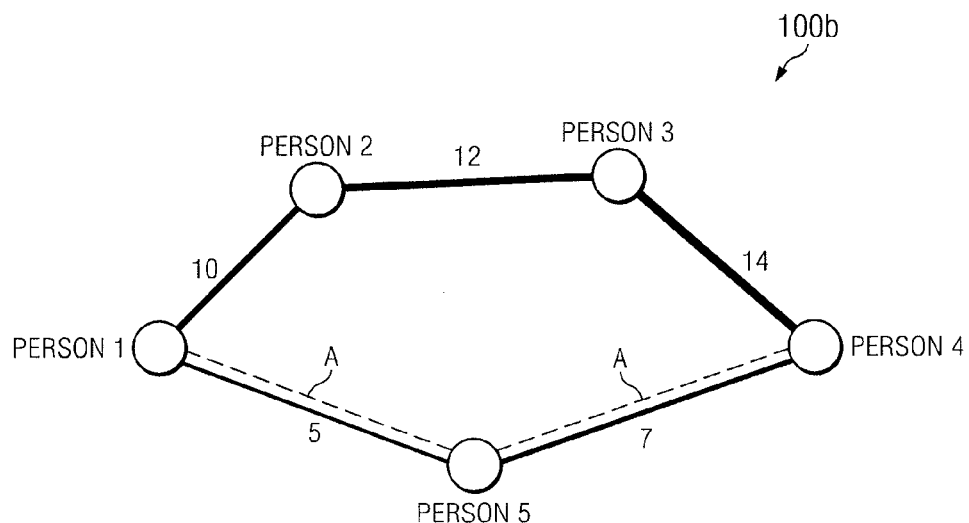
Figure 1C:
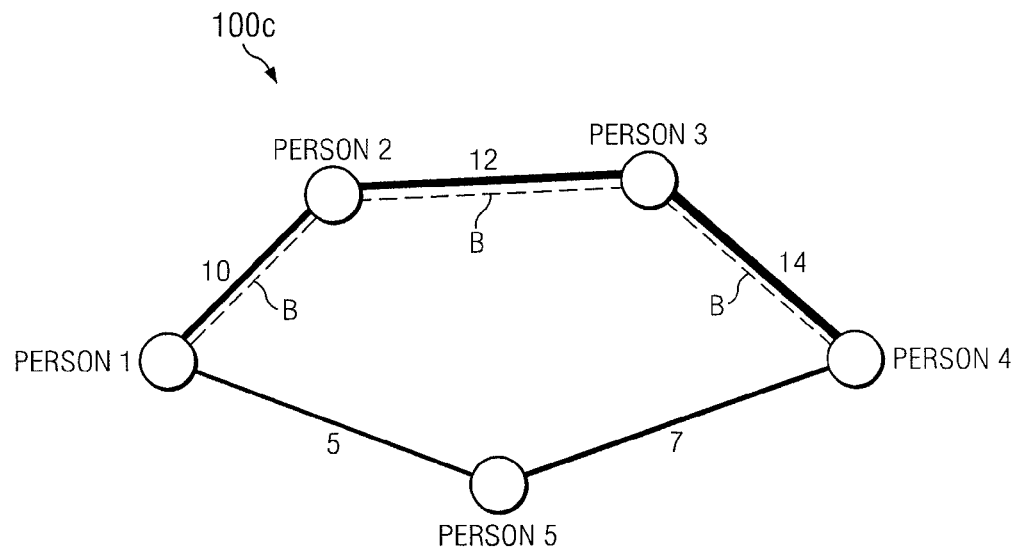

FIGS. 1A, 1B, and 1C illustrate an information management system 10 according to a particular embodiment of the present invention. System 10 includes one or more data sources 20, analysis module 30, and network 50. Analysis module 30 receives one or more data descriptors 25 from data sources 20, processes data descriptors 25, and identifies one or more connections between persons identified in data descriptors 25. Data descriptors 25, as described further below, may identify one or more persons associated with a particular message, work, communication, and/or other information. As a result, analysis module 30 may identify one or more connections between persons identified in data descriptors 25.

Data sources 20a, 20b, 20c, and 20d (which may be individually referred to as data source 20 or collectively as data sources 20) represent data storage devices and/or information services that store, generate, and/or transmit data descriptors 25 to other components of information management system 10. Data sources 20 represent any device and/or service capable of storing, retrieving, generating, transmitting and/or processing any suitable form of electronic data. For example, in particular embodiments, data source 20 represents: (i) an information feed from a news provider and/or aggregator (such as, for example, Google News®, Yahoo! News®, CNN®, an Associated Press® feed, a Reuters® feed, and a Really Simple Syndication service); (ii) an email server (such as, for example, a Microsoft Exchange® server and/or a web-based email service); (iii) a social networking site (such as, for example, Facebook®, Myspace®, LinkedIn® and/or Twitter®); (iv) a newsgroup server (such as, for example, a Usenet sever); (v) a phone records database; (vi) a patent database; (vii) a library database; (viii) an instant message records database; (ix) a photograph storage database; (x) and/or any other collection of information that indicates communication and/or collaboration between one or more persons.

Data sources 20 may include one or more application programming interfaces (API) that enable analyze 30 to connect to and/or receive data descriptors 25 from a relevant data source 20. Data descriptor 25 represents any electronic file, message, packet, and/or collection of information that identifies an instance of contact between one or more persons associated with the particular data source 20. Thus, in an example embodiment in which one or more data sources 20 represents a library database, data descriptor 25 may represent information related to a work of authorship. Data descriptor 25 may identify one or more authors associated with the work of authorship. In an example embodiment in which one or more data sources 20 represents an email server, data descriptor 25 may represent an email. Data descriptor 25 may include header information that identifies a transmitter of the email and a recipient of the email. In an example embodiment in which one or more data sources 20 represents a social networking site, data descriptor 25 may represent a tweet, a status update, a wall posting, a news story, and/or any other relevant information posted to a social networking website. Data descriptor 25 may include person sending the relevant information and a person receiving the relevant information. In an example embodiment in which one or more data sources 20 represents a phone records database, data descriptor 25 may represent a record of a telephone call. Data descriptor 25 may include a calling person a called person. In an example embodiment in which one or more data sources 20 represents a patent database, data descriptor 25 may represent an electronic record of a patent and/or patent application. Data descriptor 25 may include one or more co-inventors associated with the patent and/or patent application. In an example embodiment in which one or more data sources 20 represents an instant message records database, data descriptor 25 may represent an electronic record of a chat session. Data descriptor 25 may include a pair of persons communicating during the chat session. In an embodiment in which one or more data sources 20 represents a photograph storage database, data descriptor 25 may represent an electronic representation of a photograph. Data descriptor 25 may further include information regarding persons appearing in a photograph represented by data descriptor 25. The names of the persons appearing in a photograph may be identified in metadata included in data descriptor 25. For example, a user may indicate one or more persons present in a photograph by tagging one or more persons using photograph editing software. Thus, data descriptor 25 my indicate an instance of contact between two or more person present in a photograph. Although FIG. 1A illustrates a particular number of data sources 20, alternative embodiments of system 10 may include any appropriate number and type of data sources 20 in any suitable combination.

In some embodiments, data descriptor 25 includes information associated with one or more persons identified in a particular data descriptor 25. For example, data descriptor 25 may include information identifying a particular subject matter specialty and/or area of expertise of a particular person identified in data descriptor 25. Data descriptor 25 may additionally or alternatively include a list of works published, address and/or location information, current employer, work history, and/or any other relevant information associated with a person identified in data descriptor 25. As a result, analysis module may be able to search for individuals based on a subject matter specialty and/or area of expertise.

Analysis module 30 receives data descriptors 25 from data sources 20 and analyzes data descriptors 25 to determine one or more instances of contact between pairs of persons associated with a particular data source 20 and/or data descriptors 25. As discussed further below, analysis module 30 represents a general-purpose PC, a Macintosh, a workstation, a Unix-based computer, a server computer, and/or any suitable processing device. Accordingly, analysis module 30 may include one or more processors and/or memory to perform the above described functions. Although FIG. 1A illustrates, for purposes of example, a single analysis module 30, alternative embodiments of system 10 may include any appropriate number and type of analyzers 30 to analyze data descriptors 25 from any suitable data source 20.

To facilitate communication among the various components of system 10, data sources 20 and analysis module 30 are communicatively coupled via one or more networks 50. For example, data descriptors 25 may be communicated between or among various components of system 10 via network 50. Network 50 may represent any number and combination of wireline and/or wireless networks suitable for data transmission. Network 50 may, for example, communicate internet protocol packets, frame relay frames, asynchronous transfer mode cells, and/or other suitable information between network addresses. Network 50 may include one or more intranets, local area networks, metropolitan area networks, wide area networks, cellular networks, all or a portion of the Internet, and/or any other communication system or systems at one or more locations. Although FIG. 1A illustrates for purposes of example a single network 50, particular embodiments of system 10 may include any appropriate number and type of networks 50 that facilitate communication among one or more various components of system 10.

Example operations of system 10 will now be described with respect to various embodiments of the present disclosure. Although several example operations in accordance with various embodiments are described below, it should be understood that the present disclosure is intended to encompass other operations and functions not explicitly described. Moreover, the described example embodiments are not necessarily mutually exclusive, and particular embodiments of system 10 may perform one or more operations in the same embodiment.

In operation, analysis module 30 receives data descriptors 25 from one or more data sources 20. In some embodiments, analysis module 30 connects to one or more data sources 20 over network 50. For example, software executing on analysis module 30 may connect to an API on data source 20. Once connected, analysis module 30 may interface with the API to receive one or more data descriptors 25. Each data descriptor 25 may identify an instance of contact between one or more persons. For example, in an embodiment in which data source 20 represents a library database, data descriptor 25 may identify a book or article written by three co-authors (for purposes of this example, Author A, Author B, and Author C). In this example, analysis module 30 determines that data descriptor 25 indicates three instances of contact: an instance of contact between Author A and Author B, an instance of contact between Author A and Author C, and an instance of contact between Author B and Author C. In an embodiment in which data source 20 represents a photograph database, data descriptor 25 may identify a photograph that includes three persons (for purposes of this example, Person A, Person B, and Person C). Thus, analysis module 30 determines that data descriptor 25 indicates three instances of contact: an instance of contact between Person A and Person B, an instance of contact between Person A and Person C, and an instance of contact between Person B and Person C. In an embodiment in which data source 20 represents a patent library, data descriptor 25 may identify a patent that includes four (4) co-inventors (for purposes of this example, Inventor A, Inventor B, Inventor C, and Inventor D). In this example, analysis module 30 determines that data descriptor 25 indicates six (6) instances of contact: an instance of contact between Inventor A-Inventor B, Inventor A-Inventor C, Inventor A-Inventor D, Inventor B-Inventor C, Inventor B-Inventor D, and Inventor C-Inventor D.

In some embodiments, a first data descriptor 25 and a second data descriptor 25 may identify an instance of contact between the same pair of persons. For example, a first data descriptor 25 may represent a patent that includes Inventor A, Inventor B, and Inventor C. A second data descriptor 25 may represent a patent that includes Inventor A, Inventor C, and Inventor D. Thus, analysis module 30 determines that data descriptor 25 indicates an instance of contact between Inventor A and Inventor C in the first data descriptor 25 and the second data descriptor 25.

Once each data descriptor 25 is received and analyzed, analysis module 30 may determine a contact count for each pair of persons identified as having an instance of contact in at least one of the received data descriptors 25. In particular embodiment, a contact count represents the total number of instances of contact between a first person and a second person. Returning to the preceding example, based on receiving the first data descriptor 25 and the second data descriptor 25, analysis module 30 determines that the Inventor A-Inventor B contact count is one (1), the inventor A-Inventor C contact count is two (2), the Inventor B-Inventor C contact count is one (1), the Inventor A-Inventor D contact count is one (1), and the Inventor C-Inventor D contact count is one (1). If a third data descriptor 25 representing a patent that identifies Inventor A, Inventor D, and Inventor E, is received, the Inventor A-Inventor D contact count increases to two (2), the Inventor D-Inventor E contact count is one (1), and the Inventor A-Inventor E contact count is one (1).

As a result, for each pair of persons identified as having at least one instance of contact, analysis module 30 determines that a connection exists between the relevant pair of persons. Thus, based on receiving the first, second and third data descriptors 25 described in the previous example, analysis module 30 determines that a connection exists between Inventor A and Inventor B, between Inventor A and Inventor C, between Inventor A and Inventor D, between Inventor A and Inventor E, between Inventor B and Inventor C, between Inventor C and Inventor D, and between Inventor D and Inventor C.

Once a connection between each pair of persons is determined based on the received data descriptor(s) 25, analysis module 30 calculates a connection score for each identified connection. Analysis module 30 may calculate the connection score based at least in part on the contact count. In some embodiments, analysis module 30 sums the instances of contact to determine a connection score. Thus, a connection score may equal the contact count. In some embodiments, analysis module 30 may calculate a higher connection score for connections that include a higher contact count. For example, analysis module 30 may apply a contact multiple to the contact count to calculate a connection score. For instance, in the example described above, analysis module 30 may multiply the contact count by a contact multiple of three to calculate a connection score. Thus, the connection between Inventor A and Inventor D is calculated to have a connection score of six (6) (i.e., the contact count of two (2) times the contact multiple of three (3)). The connection between Inventor A and Inventor E is calculated to have a connection score of three (3) (i.e., the contact count of one (1) times the contact multiple of three (3)).

In some embodiments, analysis module 30 may calculate the connection score based at least in part on the recency of the instances of contact associated with a particular connection. In these embodiments, analysis module 30 applies a recency multiple to the contact instance. In some embodiments, analysis module 30 applies a higher recency multiple to more recent instances of contact and a lower recency multiple to less recent instances of contact. For example, analysis module 30 may calculate a higher connection score for connections that include more recent instances of contact. For example, in the example described above, the first data descriptor 25 may identify a patent that issued one year prior to the time the first data descriptor 25 is received. The second data descriptor 25 may identify a patent that issued fifteen (15) years prior to the time the second data descriptor 25 is received. Thus, analysis module 30 may apply, for example, a recency multiple of three (3) to instances of contact less than one (1) year old, a recency multiple of two (2) to instances of contact one (1) to five (5) years old, and a recency multiple of one (1) to instances of contact of more than five (5) years old.

In some embodiments, analysis module 30 adds the instances of contact multiplied by the contact multiple to the instances of contact multiplied by the recency multiple to determine the connection score. For example, in the example described above, the Inventor A-Inventor B connection may have a connection score of six (6). That is, the contact count of one (1) times a contact multiple of three (3) is added to the contact count of one (1) times a recency multiple of three (3) (the patent is issued less than one year prior to the date of receiving the first data descriptor 25). The Inventor A-Inventor C connection may have a connection score of four (4). That is, the contact count of one (1) times a contact multiple of three (3) is added to the contact count of one (1) times a recency multiple of one (1) (the patent issued more than five years prior to the date of receiving the second data descriptor 25).

In particular embodiments, analysis module 30 may identify a connection between a pair of persons based on data descriptors 25 received from more than one data source 20. For example, analysis module 30 may receive a first data descriptor 25 and a second data descriptor 25 from data source 20*a* and a third data descriptor 25 from data source 20*b*. A first data descriptor 25 and a second data descriptor 25 may each represent a telephone record of a phone call between Person A and Person B. A third data descriptor 25 may represent an academic paper co-authored by Person A and Person B. Thus, analysis module 30 may identify a connection between Person A and Person B based on the first data descriptor 25, the second data descriptor 25, and the third data descriptor 25. Analysis module 30 may further determine that the contact count between Person A and Person B is two (2). In some embodiments, analysis module 30 may apply a data source multiple to a contact count associated with each particular data source 20 to calculate the connection score. For example, analysis module 30 may apply a data source multiple of one (1) to connections based on data descriptors 25 received from data source 20*a* and a data source multiple of four (4) to connections based on data descriptors 25 received from data source 20*b*. To calculate a connection score, analysis module 30 may multiply a contact count by a particular data source multiple. In this example, analysis module 30 multiplies a data source multiple of one (1) to the contact count associated with data source 20*a* and multiplies a data source multiple of four (4) to the contact count associated with data source 20*b*. As a result, the connection score for the connection between Person A and Person B is six (6) (i.e., a contact count of two (2) times a data source multiple of one (1) plus a contact count of one (1) times a data source multiple of four (4)).

In some embodiments, data descriptor 25 may include an address or other geographical information associated with a person identified in data descriptor 25. Additionally or alternatively, analysis module 30 may determine geographic information from one or more second data sources 20 after receiving data descriptor from a first data source 20. In some embodiments, analysis module 30 may apply a geographic multiple to a contact count. For example, based on geographic information associated with each person in a connection 30, analysis module 30 may apply a multiple to a connection count, based on the proximity of each person to the other. Thus, for persons located within ten (10) miles of each other, analysis module may apply a multiple of five (5). For persons located within fifty (50) miles of each other, analysis module 30 may apply a multiple of three (3). As a result, a connection score associated with a particular connection may be based at least in part on the proximity to each other of the persons associated with the particular connection.

Although particular examples of calculating a connection score for a particular connection between a pair of persons are described with respect to FIG. 1A, it should be understood that any appropriate method of calculating a connection score may be used within the scope of the present disclosure. For example, the values used for a contact multiple, recency multiple, data source multiple, and/or geographic multiple may represent any suitable values based on any relevant characteristic associated with one or more instances of contact. Moreover, in some embodiments, analysis module 30 may not use any multiples in calculating a relevant connection score.

Once analysis module 30 has identified a connection and determined and a connection score for each connection between one or more pairs of persons identified in relevant data descriptors 25, analysis module 30 may perform additional analysis with respect to one or more connections. For example, in some embodiments, analysis module 30 may determine a connection path between two persons who are not directly connected by an identified connection. For example, a user may enter a first name and a second name into a user interface associated with analysis module 30. Analysis module 30 determines whether any connections associated with the first entered name and the second entered name are stored in memory 34. If the entered names are each associated with a connection in memory 34, analysis module 30 may determine a connection path between the entered names. For example, a user may enter Person1 and Person4. Analysis module 30 determines that no connection between Person1 and Person4 exists, but that each of Person1 and Person4 are associated with one or more connections in memory 34. Analysis module 30 determines each person Person1 is connected to, each person connected to each person Person1 is connected to, and so on. Analysis module 30 repeats the process for Person4. For example, analysis module 30 determines that Person1 is connected to Person8. Analysis module 30 determines that Person4 is also connected to Person8. Thus, a connection path of Person1-Person8-Person4 exists between Person1 and Person4. In some embodiments, more than one connection path exists between two or more persons. Thus, in this example, a user may query information management system 10 for connections and/or connection paths associated with a particular person.

FIGS. 1B and 1C illustrate an example graphical user interfaces (GUIs) 100*b* and 100*c* that may be displayed on a display associated with analysis module 30. As shown in FIGS. 1B and 1C, GUIs 100*b* and 100*c* may illustrate a higher connection score associated with a particular connection by displaying a thicker line between two relevant persons. For example, as discussed below, a connection between Person1 and Person5 has a connection score of five (5), and a connection between Person5 and Person4 has a connection score of seven (7). This may be shown graphically by displaying a thicker connecting line between Person5 and Person4 and the connecting line between Person5 and Person1.

In some embodiments, GUIs 100*b* and 100*c* may illustrate various connection paths between two persons, such as, for example, between Person1 and Person4. Analysis module 30 may determine a connection path in several ways. As shown in FIG. 1B, analysis module 30 may determine that a connection path of Person1-Person5-Person4 exists and a connection path of Person1-Person2-Person3-Person4 exists. As a result, analysis module 30 may determine a best connection path between Person1 and Person4 based on the connection scores associated with each connection in each respective connection path. For example, as shown in FIG. 1B, the Person1-Person5 connection may have a connection score of five (5), and the Person5-Person4 connection may have a connection score of seven (7). The Person1-Person2 connection may have a connection score of ten (10), the Person2-Person3 connection may have a connection score of twelve (12) and the Person3-Person4 connection may have a connection score of fourteen (14). In some embodiments, analysis module 30 determines that a best connection path is a connection path with the fewest number of connections. In FIG. 1B, a connection path of Person1-Person5-Person4 has two (2) connections, while a connection path of Person1-Person2-Person3-Person4 has three (3) connections. Thus, a connection path with the fewest number of connections is Person1-Person5-Person4, illustrated by dotted line A.

As a shown in FIG. 1C, analyzer 3 may additionally or alternatively analysis module 30 determine that a best connection path is a connection path with the highest average connection score. As shown in FIG. 1C, the Person1-Person5 may have a connection score of five (5), and the Person5-Person4 connection may have a connection score of seven (7). The Person1-Person2 connection may have a connection score of ten (10), the Person2-Person3 connection may have a connection score of twelve (12), and the Person3 Person4 connection may have a connection score of fourteen (14). A connection path of Person1-Person5-Person4 has an average connection score of six (6), while a connection path of Person1-Person2-Person3-Person4 has an average connection score of twelve (12). Thus a connection path with the highest average connection score is Person1-Person2-Person3-Person4, illustrated by dotted line B.

Figure 1D:
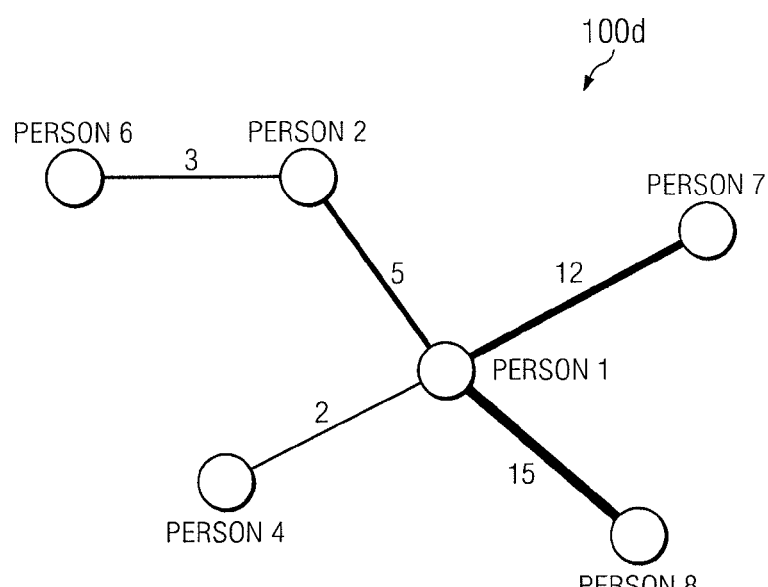

FIG. 1D illustrates an example Graphical User Interface 100d that may be displayed on a display associated with analysis module 30. In some embodiments, GUI 100d may illustrate the determination of various connections associated with a particular person. For example a user may enter a name into a user interface associated with analysis module 30. Based on the entered name, analysis module 30 may determine one or more connections associated with the entered name. For example, a user may enter Person1. Analysis module 30 may search through memory 34 for one or more connections between Person1 and another person. As shown in, FIG. 1D, analysis module 30 may determine that there are four (4) connections associated with Person1: Person1-Person7 (connection score of 12), Person1-Person8 (connection score of 15), Person1-Person4 (connection score of 2), and Person1-Person2 (connection score of 5). In some embodiments, analysis module 30 may additionally or alternatively display connections between persons who are connected to persons connected to Person1 (i.e., second order connections). For example, analysis module 30 may display a connection between Person2 and Person6 (connection score of 3). A user may further specify a number of connections to be displayed. For example, a user may configure analysis module 30 to display a maximum of five (5) connections. A user may further configure analysis module 30 to display connections with a minimum connection score. For example, a user may configure analysis module 30 to display connections with a connection score of at least 10. If such configuration were applied to the example shown in FIG. 1D, GUI 100d may display the Person1-Person7 and Person1-Person8 connections. In embodiments in which analysis module 30 displays second order connections, a user may configure analysis module 30 to display connections with a minimum average connection score along a connection path between Person1 and the second order connection. For example, a user may configure analysis module 30 to display a connection path between Person1 and a second order connection in which the connections along the connection path have an average connection score of 10.

Modifications, additions, or omissions may be made to system 10 without departing from the scope of the present disclosure. For example, when a component of system 10 determines information, the component may determine the information locally or may receive the information from a remote location. As another example, in the illustrated embodiment, data source 20 and analysis module 30 are represented as different components of system 10. However, the functions of data source 20 and analysis module 30 may be performed by any suitable combination of one or more modules, servers or other components at one or more locations. In the embodiment where the various components are servers, the servers may be public or private servers, and each server may be a virtual or physical server. The server may include one or more servers at the same or at remote locations. Also, data sources 20 and analysis module 30 may include any suitable component that functions as a server. Additionally, system 10 may include any appropriate number of data sources 20 and analysis module 30. Any suitable logic may perform the functions of system 10 and the components within system 10.

Particular embodiments of the present disclosure may provide numerous operational benefits, including determining a connection path between two or more persons. Particular embodiments may determine a shortest path between two persons and/or a connection path with the strongest relationships between two persons. In a sales operation, this may facilitate an introduction between two persons who were previously unknown to each other. For example, a sales person may wish to be introduced to a manager at a target company. Utilizing particular embodiments, relationships between various connections may be determined to allow the sales person to identify the desired contact. Thus, the sales person may be able to contact one or more persons in a relationship path to obtain an introduction to the manager. Particular embodiments may additionally be able to determine a persons immediate or more remote connections, and identify the relative strength of those connections. This may facilitate the investigation of fraud rings. For example, an organization may suspect a person of committing fraud, and may utilize particular embodiments of system 10 to determine who the suspected persons was communicating with, and the relative strength of those contacts. As a result, system 10 may provide numerous operational benefits. Nonetheless, particular embodiments may provide some, none, or all of these operational benefits, and may provide additional operational benefits.

Figure 2:
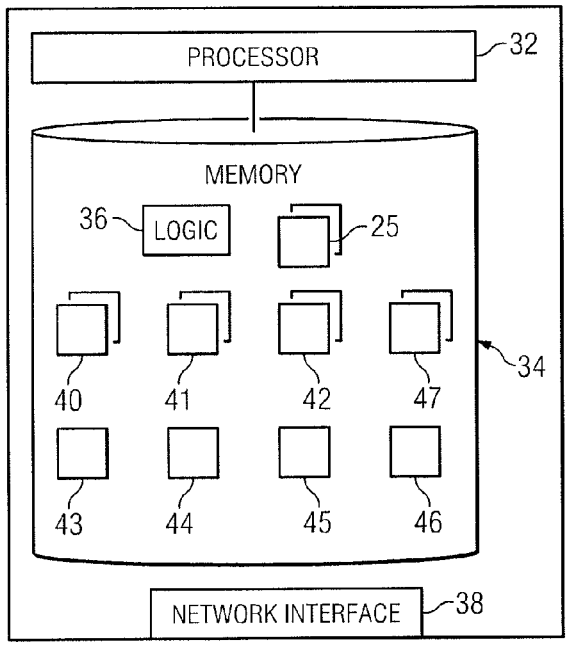
FIG. 2 illustrates an analyzer from FIG. 1 in more detail, in accordance with particular embodiments of the present disclosure.

FIG. 2 is a block diagram illustrating aspects of analysis module 30 discussed above with respect to FIG. 1. As discussed above, analysis module 30 receives data descriptors 25 from one or more data sources 20, determines one or more connections between one or more pairs of persons identified in data descriptors 25, and determines one or more connection paths between one or more persons. Analysis module 30 includes processor 32, memory 34, logic 36, and network interface 38.

Analysis module 30 comprises any suitable combination of hardware and/or software implemented in one or more modules to provide the described functions and operations. In some embodiments, analysis module 30 may comprise a general-purpose personal computer (PC), a Macintosh, a workstation, a Unix-based computer, a server computer, or any suitable processing device. In some embodiments, the functions and operations described above may be performed by a pool of multiple analyzers 30.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, queries or other arrangements of information such as data descriptors 25, connections 40, contact counts 41, connection scores 42, contact multiple 43, recency multiple 44, data source multiple 45, geographic multiple 46, and/or connection paths 47. Although FIG. 2 illustrates memory 34 as internal to analysis module 30, it should be understood that memory 34 may be internal or external to analysis module 30, depending on particular implementations. Memory 34 may be separate from or integral to other memory devices to achieve any suitable arrangement of memory devices for use in information decluttering system 10.

Memory 34 is further operable to store logic 36. Logic 36 generally comprises rules, algorithms, code, tables, and/or other suitable instructions for receiving, storing, generating, and/or analyzing data descriptors 25. Logic 36 also comprises instructions for analyzing data descriptors 25, including determining a contact count between one or more pairs of persons, identifying a connection 40 between one or more pairs of persons, determining a connection score 42 associated with one or more connections 40, and/or determining a connection path 47 between one or more persons based on a plurality of connections 40, as described herein.

Memory 34 is communicatively coupled to processor 32. Processor 32 is generally operable to execute logic 36 to perform the described functions. Processor 32 comprises any suitable combination of hardware and software implemented in one or more modules to provide the described function or operation.

Network interface 38 communicates information with network 50. For example, network interface 38 receives data descriptor 25 from data source 20 through network 50. Network interface 38 represents any port or connection, real or virtual, including any suitable hardware and/or software that enables analysis module 30 to exchange information with network 50, data source 20, and/or or other components of system 10.

Figure 3:
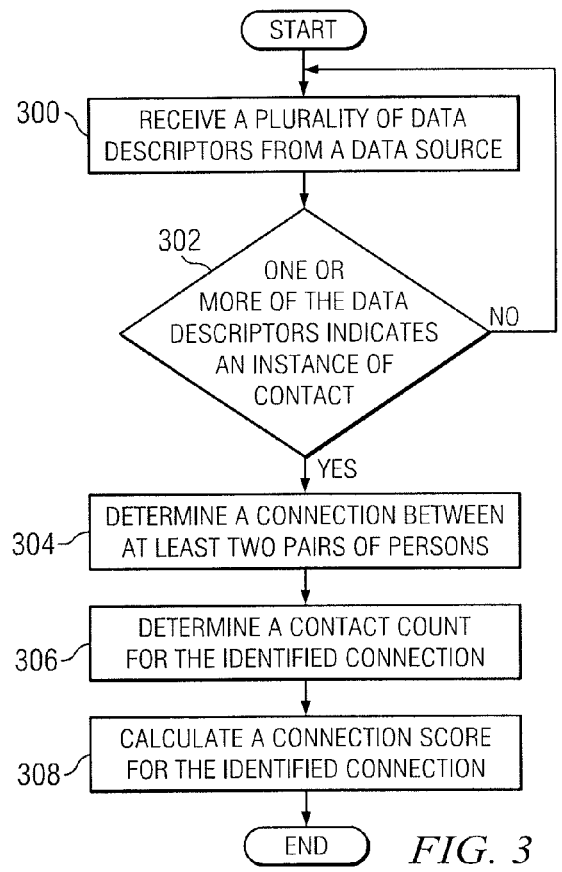
FIG. 3 is a flow chart illustrating a particular operation of the information management system of FIG. 1 in accordance with particular embodiments of the present disclosure.

FIG. 3 is a flow diagram illustrating an operation of system 10 in accordance with a particular embodiment. It should be understood that the flow diagram illustrated in FIG. 3 represents one example of an operation that may be performed in a particular embodiment of system 10. System 10 may perform other operations in accordance with particular embodiments of the present disclosure.

Operation, in the illustrated example, begins at step 300 with a plurality of data descriptors 25 being received from a first data source 20. As discussed above, analysis module 30 may receive data descriptors 25 by connecting to an Application Programming Interface of data sources 20. Analysis module 30 may periodically connect to data source 20 or may connected to data source 20 in response to a request from a user. Once connected, analysis module 30 may receiving one or more data descriptors 25.

In step 302, analysis module 30 determines whether one or more of the data descriptors 25 indicates an instance of contact between at least two of a plurality of persons. For example, analysis module 30 may analyze each data descriptor 25 to determine whether data descriptor 25 includes one or more persons that have connected in some way, for example, through collaboration or some other way. For example, an instance of contact may represent an email between a sender and receiver, a book published by co-authors, an article written by co-authors, a patent issued to co-inventors, and/or a telephone conversation between a called party and a calling party. If at least one data descriptor 25 indicates an instance of contact between at least two of a plurality of persons, operation proceeds at step 304. If not, operation returns to step 300.

In step 304, analysis module 30 identifies a connection between at least two persons. In some embodiments, analysis module 30 identifies a connection for instance of contact identified in a particular data descriptor 25. That is, in particular embodiments, for each pair of persons identified as having an instance of contact in a particular data descriptor 25, analysis module 30 identifies a connection. If the same two persons have an instance of contact in more than one data descriptor 25, analysis module 30 may identify a single connection between the respective two persons.

In step 306, analysis module 30 determines a contact count for each identified connection. For example, for each identified connection, analysis module 30 may determine the number of instances of contact between the pair of persons associated with the respective connection. Thus, a contact count may represent a number of times a pair of persons have been in communication and/or have collaborated.

In step 308, calculates a connection score for each identified connection. In some embodiments, each connection score may be based at least in part on the contact count for the pair of persons associated with the connection. Additionally or alternatively, in some embodiments analysis module 30 calculates a connection score by applying a multiple to the contact count. For example, analysis module 30 may apply a contact multiple, data source multiple, recency multiple, and/or geographic multiple to calculate a connection score for each connection. Moreover, any appropriate method of calculating a connection score may be used within the scope of the present disclosure. For example, the values used for the contact multiple, recency multiple, and data source multiple may represent any suitable values based on any relevant characteristic associated with one or more instances of contact. Moreover, in some embodiments, analysis module 30 may not use any multiples in calculating a relevant connection score.

The steps illustrated in FIG. 3 may be combined, modified, or deleted where appropriate, and additional steps may also be added to those shown. Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
    connecting to a plurality of data sources, each data source comprising a collection of information indicating communication or collaboration between one or more persons;
    receiving, from a first data source, a first data descriptor, wherein the first data descriptor identifies an instance of contact between at least two persons;
    determining a connection between the at least two persons, wherein the connection is based on an instance of contact between the at least two persons identified in the first data descriptor;
    determining, with a processor, a first contact count for the connection, the first contact count based on a number of instances of contact between the at least two persons associated with the connection;
    calculating, with the processor, a connection score for the connection, wherein the connection score is based at least in part on the first contact count; and
    determining a connection path between a first person and a second person, wherein the connection path comprises one or more intermediary connections between one or more persons identified in one or more data descriptors, the connection path determined between selecting a least number of intermediary connections between the first person and the second person and selecting intermediary connections with a highest average connection score between the first person and the second person.

2. The method of claim 1, further comprising:
    receiving, from a second data source, a plurality of second data descriptors, wherein one or more of the second data descriptors identifies an instance of contact between the at least two persons, and wherein the determined connection is further based on the one or more instances of contact between the at least two persons identified in the second data descriptors;

for the determined connection, determining a second contact count, the second contact count based on the number of instances of contact between the at least two persons identified in the second data descriptors;

determining a first data source weight associated with the first data source;

determining a second data source weight associated with the second data source; and wherein calculating the connection score comprises calculating the connection score based at least in part on the first contact count, the second contact count, the first data source weight, and the second data source weight.

3. The method of claim 1, further comprising:

selecting a person from a plurality of persons identified in one or more data descriptors;

selecting one or more determined connections, wherein each identified connection is based on one or more instances of contact between the selected person and another persons identified in the one or more data descriptors.

4. A system comprising:

one or more memory devices operable to store a plurality of data descriptors identifying instances of contact between at least two persons; and an analysis module operable to:

connect to a plurality of data sources, each data source comprising a collection of information indicating communication or collaboration between one or more persons;

access a first data descriptor from a first data source;

determine a connection between the at least two persons, wherein the connection is based on an instance of contact between the at least two persons identified in the first data descriptor;

determine, with a processor, a first contact count for the connection, the first contact count based on a number of instances of contact between the at least two persons associated with the connection;

calculate, with the processor, a connection score for the connection, wherein the connection score is based at least in part on the first contact count; and determine a connection path between a first person and a second person, wherein the connection path comprises one or more intermediary connections between one or more persons identified in one or more data descriptors, the connection path determined between selecting a least number of intermediary connections between the first person and the second person and selecting intermediary connections with a highest average connection score between the first person and the second person.

5. The system of claim 4, the analysis module further operable to:

access one or more second data descriptors from a second data source, the one or more second data descriptors identifying an instance of contact between the at least two persons, and wherein the determined connection is further based on the one or more instances of contact between the at least two persons identified in the second data descriptors;

for the determined connection, determine a second contact count, the second contact count based on the number of instances of contact between the at least two persons identified in the second data descriptors;

determine a first data source weight associated with the first data source;

determine a second data source weight associated with the second data source; and wherein the analysis module is operable to calculate the connection score by calculating the connection score based at least in part on the first contact count, the second contact count, the first data source weight, and the second data source weight.

6. The system of claim 4, wherein the analysis module is further operable to:

select a person from a plurality of persons identified in one or more data descriptors;

select one or more determined connections, wherein each identified connection is based on one or more instances of contact between the selected person and another persons identified in the one or more data descriptors.

7. A non-transitory computer-readable medium encoded with logic, the logic operable, when executed on a processor to:

connect to a plurality of data sources, each data source comprising a collection of information indicating communication or collaboration between one or more persons;

receive a first data descriptor from a first data source, wherein the first data descriptor identifies an instance of contact between at least two persons;

determine a connection between the at least two persons, wherein the connection is based on an instance of contact between the at least two persons identified in the first data descriptor;

determine a first contact count for the connection, the first contact count based on a number of instances of contact between the at least two persons associated with the connection;

calculate a connection score for the connection, wherein the connection score is based at least in part on the first contact count; and determine a connection path between a first person and a second person, wherein the connection path comprises one or more intermediary connections between one or more persons identified in one or more data descriptors, the connection path determined between selecting a least number of intermediary connections between the first person and the second person and selecting intermediary connections with a highest average connection score between the first person and the second person.

8. The non-transitory computer-readable medium of claim 7, wherein the logic is further operable to:

receiving, from a second data source, a plurality of second data descriptors, wherein one or more of the second data descriptors identifies an instance of contact between the at least two persons, and wherein the determined connection is further based on the one or more instances of contact between the at least two persons identified in the second data descriptors;

for the determined connection, determine a second contact count, the second contact count based on the number of instances of contact between the at least two persons identified in the second data descriptors;

determine a first data source weight associated with the first data source;

determine a second data source weight associated with the second data source; and wherein the analysis module is operable to calculate the connection score by calculating the connection score based at least in part on the first contact count, the second contact count, the first data source weight, and the second data source weight.

9. The non-transitory computer-readable medium of claim 7, wherein the logic is further operable to:
select a person from a plurality of persons identified in one or more data descriptors;
select one or more determined connections, wherein each identified connection is based on one or more instances of contact between the selected person and another persons identified in the one or more data descriptors.

10. The method of claim 1, wherein connecting to the plurality of data sources comprises utilizing one or more application programming interfaces (APIs).

11. The system of claim 4, wherein connecting to the plurality of data sources comprises utilizing one or more application programming interfaces (APIs).

12. The method of claim 1, wherein the first contact count is based on a total number of instances of contact between the at least two persons associated with the connection, the total number of instances being determined from the first data descriptor.

* * * * *